US010240012B2

(12) United States Patent
Van Tooren et al.

(10) Patent No.: US 10,240,012 B2
(45) Date of Patent: Mar. 26, 2019

(54) THERMOPLASTIC/THERMOSET GRAFTED COMPOSITES

(71) Applicants: UNIVERSITY OF SOUTH CAROLINA, Columbia, SC (US); CLEMSON UNIVERSITY, Clemson, SC (US)

(72) Inventors: Michael Van Tooren, Columbia, SC (US); Igor Luzinov, Seneca, SC (US)

(73) Assignees: University of South Carolina, Columbia, SC (US); Clemson University, Clemson, SC (US)

( * ) Notice: Subject to any disclaimer, the term of this patent is extended or adjusted under 35 U.S.C. 154(b) by 90 days.

(21) Appl. No.: 15/234,438

(22) Filed: Aug. 11, 2016

(65) Prior Publication Data

US 2017/0044337 A1 Feb. 16, 2017

Related U.S. Application Data

(60) Provisional application No. 62/203,663, filed on Aug. 11, 2015.

(51) Int. Cl.
*C08J 5/12* (2006.01)
*B29C 65/48* (2006.01)
(Continued)

(52) U.S. Cl.
CPC .......... *C08J 5/128* (2013.01); *B29C 65/4835* (2013.01); *C08J 7/08* (2013.01); *C08J 7/16* (2013.01); *B29K 2063/00* (2013.01); *B29K 2701/10* (2013.01); *B29K 2701/12* (2013.01); *B29L 2009/00* (2013.01); *C08J 2300/22* (2013.01);
(Continued)

(58) Field of Classification Search
CPC ....... C08J 5/128; C08J 7/16; C08J 7/08; C08J 2300/22; C08J 2463/00; C08J 2300/24; C08J 2309/00; C08J 2323/20; C08J 2333/04; B29C 65/4835; B29K 2063/00; (Continued)

(56) References Cited

U.S. PATENT DOCUMENTS 5,118,430 A * 6/1992 Rebouillat .......... D06M 15/233
252/8.82
5,698,725 A * 12/1997 Hayashi .................. C03C 25/40
428/391

(Continued)

FOREIGN PATENT DOCUMENTS

WO WO 2012/161569 A1 11/2012

OTHER PUBLICATIONS

Abstract of Ageorges, C., Ye, L., Fusion Bonding of Polymer Composites, ISBN 1-85233-429-0 Springer-Verlag 2002.
Burtovyy, O.; Klep, V.; Chen, H. C.; Hu, R. K.; Lin, C. C.; Luzinov, I., Hydrophobic modification of polymer surfaces via "grafting to" approach. Journal of Macromolecular Science Part B—Physics 2007, 46 (1), 137-154.

(Continued)

*Primary Examiner* — David T Karst
(74) *Attorney, Agent, or Firm* — Dority & Manning, P.A.

(57) ABSTRACT

Disclosed are thermoset/thermoplastic composites that include a thermoset component directly or indirectly bonded to a thermoplastic component via a crosslinked binding layer between the two. The crosslinked binding layer is bonded to the thermoplastic component via epoxy linkages and is either directly or indirectly bonded to the thermoset component via epoxy linkages. The composite can be a laminate and can provide a route for addition of a thermoplastic implant to a thermoset structure.

20 Claims, 3 Drawing Sheets

(51) Int. Cl.
| | |
|---|---|
| *C08J 7/16* | (2006.01) |
| *B29C 71/02* | (2006.01) |
| *B29K 63/00* | (2006.01) |
| *B29K 701/12* | (2006.01) |
| *B29K 701/10* | (2006.01) |
| *B29L 9/00* | (2006.01) |

(52) U.S. Cl.
CPC ........ *C08J 2300/24* (2013.01); *C08J 2309/00* (2013.01); *C08J 2323/20* (2013.01); *C08J 2333/04* (2013.01); *C08J 2463/00* (2013.01)

(58) Field of Classification Search
CPC ............ B29K 2701/12; B29K 2701/10; B29L 2009/00
USPC ........................................................ 428/413
See application file for complete search history.

(56) References Cited

U.S. PATENT DOCUMENTS

| | | | |
|---|---|---|---|
| 6,875,501 | B2 | 4/2005 | Labordus et al. |
| 7,026,014 | B2 | 4/2006 | Luzinov et al. |
| 7,261,938 | B2 | 8/2007 | Luzinov et al. |
| 7,985,451 | B2 | 7/2011 | Luzinov et al. |
| 8,389,114 | B2 | 3/2013 | Luzinov et al. |
| 9,211,674 | B2 | 12/2015 | Van Tooren |
| 2004/0053027 | A1 | 3/2004 | Labordus et al. |
| 2004/0151921 | A1 | 5/2004 | Labordus et al. |

OTHER PUBLICATIONS

Burtovyy, O.; Klep, V.; Turel, T.; Gowayed, Y.; Luzinov, I., Modification of nylon membrane surface with thin polymer layer via "graftin to" approach. Polymer Preprints 2007, 48 (1), 725.

Abstract of Burtovyy, O.; Klep, V.; Turel, T.; Gowayed, Y.; Luzinov, I., Polymeric membranes: surface modification by "grafting to" method and fabrication of multilayered assemblies, in Nanoscience and Nanotechnology for Chemical and Biological Defense, Editors: Nagarajan, R.; Zukas, W.; Hatton, T. A.; Lee, S. ACS Symposium Series 1016, ACS, Washington DC: Chapter 22 (in press) 2009; p. 289-305.

Burtovyy, R.; Rubin, B.; Kesimci, M. O.; Luzinov, I.; Owens, J.; Kornev, K. G., "Surface Differential Scanning Calorimeter for Evaluation of Evaporative Cooling Efficiency" Journal of Engineered Fibers and Fabrics 2012, 7, 58-62.

Chyasnavichyus, M.; Tsyalkovsky, V.; Zdyrko, B.; Luzinov, I., "Tuning Fluorescent Response of Nanoscale Film With Polymer Grafting" Macromolecular Rapid Communications 2012, 33(3), 237-241.

Draper, J.; Luzinov, I.; Minko, S.; Tokarev, I.; Stamm, M., "Mixed Polymer Brushes by Sequential Polymer Addition: Anchoring Layer Effect" Langmuir 2004, 20, 4064.

Advancing Novel Antibody Mextures in the Age of Precision Medicine. Symphongen. http://www.symphogen.com/SymphageTM_technology/antibody.gif, 2018.

http://wyss.harvard.edu/viewmedia/100/microfluidicdevice;jsessionid=C733BEAE71605DF4774FAC177AAE4844.wyss2, 2017.

Iyer, K. S.; Zdyrko, B.; Malz, H.; Pionteck, J.; Luzinov, I., "Polystyrene Layers Grafted to Macromolecular Anchoring Layer." Macromolecules 2003, 36, 6519-6526.

Kovalenko, I.; Zdyrko, B.; Magasinski, A.; Hertzberg, B.; Milicev, Z.; Burtovyy, R.; Luzinov, I.; Yushin, G., A Major Constituent of Brown Algae for Use in High-Capacity Li-Ion Batteries. Science 2011, 333 (6052), 75-79.

Li, X., et al. (2010). "Fabrication of paper-based microfluidic sensors by printing." Colloids and Surfaces B: Biointerfaces 76(2): 564-570.

Abstract of Liu, Y.; Klep, V.; Luzinov, I., JACS "To Patterned Binary Polymer Brushes via Capillary Force Lithography and Surface-Initiated Polymerization." 2006, 128, 8106.

Liu, Y.; Klep, V.; Zdyrko, B.; Luzinov, I., "Polymer Grafting via ATRP Initiated from Macroinitiator Synthesized on Surface." Langmuir 2004, 20, 6710.

Abstract of Liu, Y.; Klep, V.; Zdyrko, B.; Luzinov, I., Langmuir "Synthesis of High-Density Grafted Polymer Layers with Thickness and Grafting Density Gradients." 2005, 21, 11806.

Liu, Y.; Luzinov, I.; Klep, V. (2009) Segregated polymer brushes via "grafting to" and ATRP "grafting from" chain anchoring, in Controlled/Living Radical Polymerization: Progress in ATRP, K. Matyjaszewski editor, ACS Symposium Series 1023, Ch. 15, Washington DC, 215.

Luzinov, I., Nanofabrication of thin polymer films, in Nanofibers and Nanotechnology in Textiles, Eds: Brown, P. J.; Stevens, K Woodhead, 2007; p. 448.

Luzinov, I.; Minko, S.; Tsukruk, V.V. "Responsive brush layers: from tailored gradients to reversibly assembled nanoparticles." Soft Matter 2008, 4(4), 714-725.

Motornov, M.; Malynych, S. Z.; Pippalla, D. S.; Zdyrko, B.; Royter, H.; Roiter, Y.; Kahabka, M.; Tokarev, A.; Tokarev, I.; Zhulina, E.; Kornev, K. G.; Luzinov, I.; Minko, S., "Field-Directed Self-Assembly with Locking nanoparticles," Nano Letters 2012, 12 (7), 3814-3820.

Offringa A., Van Ingen, J.W., Buitenhuis A., "Butt-joined, Thermoplastic Stiffened-skin Concept Development," Sampe Journal Mar./Apr. 2012, 7-15.

Abstract of Ramaratnam, K.; Tsyalkovsky, V.; Klep, V.; Luzinov, I., Ultrahydrophobic textile surface via decorating fibers with monolayer of reactive nanoparticles and non-fluorinated polymer. Chemical Communications 2007, (43), 4510-4512.

Seeber, M.; Zdyrko, B.; Burtovvy, R.; Andrukh, T.; Tsai, C.-C.; Owens, J. R.; Kornev, K. G.; Luzinov, I., "Surface grafting of thermoresponsive microgel nanoparticle," Soft Matter 2011, 7 (21), 9962-9971.

Singh, N.; Husson, S. M.; Zdyrko, B.; Luzinov, I., "Surface modification of microporous PVDF membranes by ATRP," Journal of Membrane Science 2005, 262 (1-2), 81-90.

Abstract of Tsyalkovsky, V.; Klep, V.; Ramaratnam, K.; Lupitskyy, R.; Minko, S.; Luzinov, I., Chemistry of Materials 2008, 20, 317.

Van Ingen, J.W., Buitenhuis, A., "Development of the Gulfstream G650 Induction Welded Thermoplastic Elevators and Rudder," SAMPE International Conference & Exhibition, Seattle, May 2010.

Vatansever, F.; Burtovyy, R.; Zdyrko, B.; Ramaratnam, K.; Andrukh, T.; Minko, S.; Owens, J. R.; Kornev, K. G.; Luzinov, I., "Toward Fabric-Based Flexible Microfluidic Devices: Pointed Surface Modification for pH Sensitive Liquid Transport," ACS Applied Materials & Interfaces 2012, 4 (9), 4541-4548.

Zdyrko, B.; Hoy, O.; Kinnan, M. K.; Chumanov, G.; Luzinov, I., "Nano-patterning with polymer brushes via solvent-assisted polymer grafting," Soft Matter 2008, 4, 2213-2219.

Zdyrko, B.; Hoy, O.; Luzinov, I., "Toward protein imprinting with polymer brushes," Biointerphases 2009, 4 (2), FA17-FA21.

Zdyrko, B.; Iyer, K. S.; Luzinov, I., "Macromolecular anchoring layers for polymer grafting: comparative study." Polymer 2006, 47 (1), 272-279.

Zdyrko, B.; Kinnan, M. K.; Chumanov, G.; Luzinov, I., "Fabrication of optically active flexible polymer films with embedded chain-like arrays of silver nanoparticles." Chem. Comm. 2008, 1284-1286.

Zdyrko, B.; Klep, V.; Luzinov, I., "Synthesis and Surface Morphology of High-Density Poly(ethylene glycol) Grafted Layers." Langmuir 2003, 19 (24), 10179-10187.

Zdyrko, B.; Klep, V.; Xiaowei, L.; Qian, K.; Minko, S.; Xuejun, W.; Luzinov, I., "Polymer brushes as active nanolayers for tunable bacteria adhesion." Materials Science & Engineering: C 2009, 680-684.

Zdyrko, B.; Luzinov, I., "Polymer Brushes by the "Grafting to" Method." Macromolecular Rapid Communications 2011, 32 (12), 859-869.

\* cited by examiner

THERMOPLASTIC/THERMOSET GRAFTED COMPOSITES

CROSS REFERENCE TO RELATED APPLICATION

This application claims filing benefit of U.S. Provisional Patent Application Ser. No. 62/203,663 having a filing date of Aug. 11, 2015, which is incorporated herein by reference in its entirety.

BACKGROUND

Polymers can generally be categorized as either thermoset polymers or thermoplastic polymers. Thermosets include polymers that are highly crosslinked and while they may exhibit some softening upon heating, they cannot be melted and reformed. While the lack of recyclability of thermosets is a detraction as is the fact that components formed of thermoset compositions cannot be welded to other materials, these components offer excellent physical characteristics including temperature and chemical resistance and dimensional stability as well as being very cost effective. Thermoplastic polymers exhibit a melting temperature and as such are capable of welding and recycling. In addition, they can exhibit higher impact resistance than thermosets and can also be highly resistant to chemical degradation. Unfortunately, thermoplastic polymers, particularly thermoplastic engineering polymers, can be quite expensive.

Composites that can incorporate both thermoplastic compositions and thermoset compositions could provide the desirable characteristics of both polymer types while mitigating the less desirable features. Unfortunately, primarily due to the difficulty in adhering thermoplastic components to thermoset components, it has proven very difficult to combine the two materials in formation of a stable composite structure. While improvements have been made in forming hybrid thermoset/thermoplastic composites, for instance through the utilization of epoxy-based blended polymers, such as toughened epoxies, the ability to form hybrid composite assemblies by use of thermoplastic zones in thermoset compotes and relatively quick and inexpensive processing techniques such as fusion bonding, has still not been achieved.

What are needed in the art are methods for formation of thermoset/thermoplastic composites and composites formed thereby. For instance, low cost hybrid thermoset/thermoplastic composites that exhibit the dimensional stability and resistance of thermosets while exhibiting the fusion welding capability of thermoplastics would be of great benefit.

SUMMARY

Aspects and advantages of the invention will be set forth in part in the following description, or may be obvious from the description, or may be learned through practice of the invention.

In one embodiment disclosed herein is a method for forming a composite. For instance, a method can include grafting a binding polymer to a surface of a thermoplastic component. The binding polymer can include a plurality of epoxy groups and the grafting can include reaction of a first portion of the epoxy groups with a reactive functionality at the surface of the thermoplastic component. For instance, the reactive functionality can be a component of a thermoplastic polymer of the component.

The method also includes crosslinking the binding polymer via reaction of a second portion of the epoxy groups thus forming a crosslinked binding layer on the surface. In addition, the method includes reacting a third portion of the epoxy groups and thereby directly or indirectly bonding the binding layer to a thermoset component, and in one embodiment, to reactive functionality of a thermoset polymer of the component.

Also disclosed are composites that can include a thermoplastic component, a thermoset component, and a binding layer between the two components. More specifically, the binding layer is a cross-linked layer that is bonded to the thermoplastic component via linkage that includes the reaction product of a first epoxy functionality of the binding layer and is bonded to the thermoset component via linkage that includes the reaction product of a second epoxy functionality of the binding layer.

In one embodiment, the composite can be a laminate structure, for instance a laminate structure that can be utilized in formation of a larger assembly. In one particular embodiment, a composite can include a thermoset section (e.g., a base plate), a hybrid thermoplastic/thermoset section, and a thermoplastic section (e.g., a thermoplastic implant), thus providing a thermoplastic implant within a thermoset base plate. The thermoplastic section can then be utilized to join the thermoset base plate to another thermoplastic component or a hybrid thermoplastic/thermoset section via fusion welding or the like. In one embodiment, the bonded materials can be portions of a larger assembly, for instance a shell structure in a transportation application (e.g., aerospace).

These and other features, aspects and advantages of the present disclosure will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
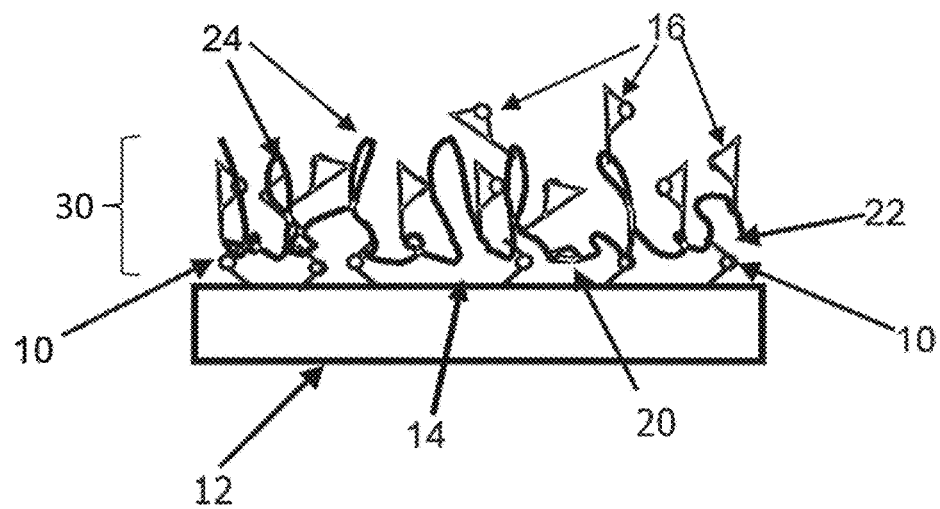
FIG. 1 illustrates an epoxy-containing binding layer grafted to a thermoplastic component.

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to composite structures that include a thermoset component bonded to a thermoplastic component. As utilized herein, the terms 'thermoset component' and 'thermoplastic component' generally refer to structures that include a thermoset composition or a thermoplastic composition, respectively, at least at the surface of the structure. The primary polymer of a thermoset composition being one or more thermoset polymers and the primary polymer of a thermoplastic composition being one or more thermoplastic polymers.

A composite structure can not only exhibit desirable qualities of both components such as impact resistance, thermal and chemical resistance, and dimensional stability, but can also be fusion bonded (e.g., welded) to other components via the thermoplastic component. For instance, a composite structure can be fusion welded to a second component that includes a thermoplastic composition at the surface at which the attachment is made.

In one particular embodiment, the composite structure can be a laminate structure that includes a plurality of stacked layers attached to one another. For instance, a laminate structure can include layers of fiber reinforced thermoplastic tapes, tows, sheets, etc. alternating with layers of fiber reinforced thermoset tapes, tows, sheets, etc. Of course, the present disclosure is not limited to fiber reinforced laminate materials and can be beneficially utilized to bond any thermoplastic component to any thermoset component.

A thermoplastic component can include a thermoplastic composition at least at the surface of the component. While a thermoplastic composition can include any thermoplastic polymer or combination thereof, in one embodiment, the thermoplastic composition can include a high performance thermoplastic polymer that can exhibit high mechanical properties such as stiffness, toughness, and low creep that make them valuable in the manufacture of structural products like gears, bearings, electronic devices, and vehicle parts (e.g., automobile and/or aerospace applications such as aerospace shell structures). A high performance polymer employed in the thermoplastic composition is generally substantially amorphous or semi-crystalline in nature and has a relatively high glass transition temperature. For example, the glass transition temperature of the thermoplastic polymer may be about 100° C. or more, in some embodiments about 110° C. or more, in some embodiments from about 120° C. to about 260° C., and in some embodiments, from about 130° C. to about 230° C. The glass transition temperature may be determined as is well known in the art using differential scanning calorimetry ("DSC"), such as determined by ISO Test No. 11357. High performance thermoplastic polymers as may be included in a thermoplastic composition can include, for example, polyarylene sulfides, polyaryletherketones, polyetherimides, polycarbonates, polyamides, etc., as well as combination of polymers.

By way of example, a polyarylene sulfide may be a polyarylene thioether containing repeat units of the following formula:

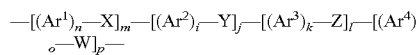

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —($C_6H_4$—S)$_n$—(wherein n is an integer of 1 or more) as a component thereof. Examples of phenylene groups that can be present in a polyphenylene sulfide resin include p-phenylene, m-phenylene, o-phenylene and substituted phenylene groups (wherein the substituent is an alkyl group preferably having 1 to 5 carbon atoms or a phenyl group), p,p'-diphenylene sulfone, p,p'-biphenylene, p,p'-diphenylene ether, p,p'-diphenylenecarbonyl and naphthalene groups.

Although an arylene sulfide homopolymer constituted of the same repeating units among the arylene sulfide groups described above may be used, the use of a copolymer constituted of a plurality of repeating units different from each other is preferable in some cases with respect to the processability of the resulting composition. For example, a copolymer may be any one constituted of two or more repeating units selected from among the arylene sulfide units mentioned above.

A polyarylene sulfide may be linear, semi-linear, or branched. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, with the amount of branching or cross-linking units generally less than about 1 mol % of the total monomer units of the polyarylene sulfide. A linear polyarylene sulfide polymer may be a random copolymer or a block copolymer containing the above-mentioned repeating unit.

Polyaryletherketones are semi-crystalline polymers with a relatively high melting temperature, such as from about 300° C. to about 400° C. The glass transition temperature may be about 100° C. or more, in some embodiments from about 110° C. to about 200° C. The melting and glass transition temperatures may be determined as is well known in the art using differential scanning calorimetry ("DSC"), such as determined by ISO Test No. 11357.

In one particular embodiment, for example, the polyaryletherketone is a homopolymer or copolymer containing a repeat unit of the following general Formula:

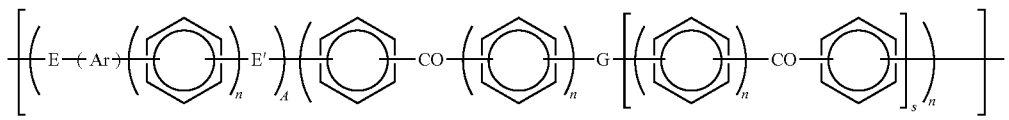

wherein,

A and B are independently 0 or 1;

m and r are independently zero or a positive integer, for example from 0 to 3;

s and w are independently zero or a positive integer, for example from 0 to 2;

E and E' are independently an oxygen atom or a direct link;

G is an oxygen atom, a direct link, or —O-Ph-O— where Ph is a phenyl group; and

Ar is one of the following moieties (i) to (vi), which is bonded via one or more of phenyl moieties to adjacent moieties:

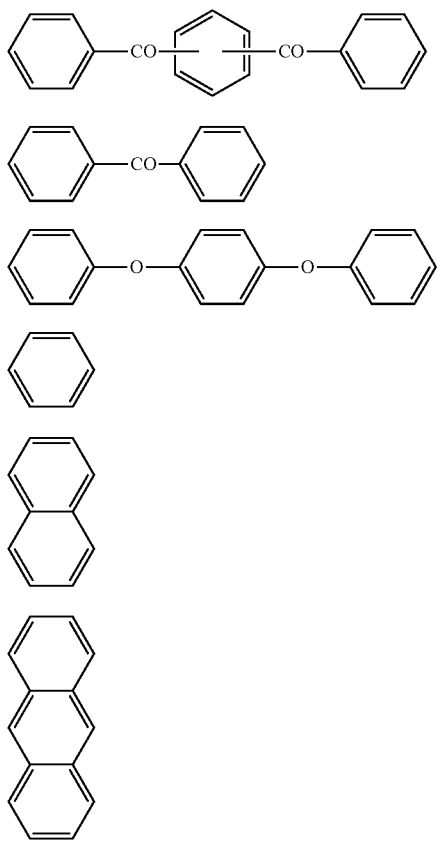

Examples of such polymers include polyetheretherketone ("PEEK") (wherein in Ar is moiety (iv), E and E' are oxygen atoms, m is 0, w is 1, G is a direct link, s is 0, and A and B are 1); polyetherketone ("PEK") (wherein E is an oxygen atom, E' is a direct link, Ar is moiety (i), m is 0, A is 1, B is 0); polyetherketoneketone ("PEKK") (wherein E is an oxygen atom, Ar is moiety (i), m is 0, E' is a direct link, A is 1, and B is 0); polyetherketoneetherketoneketone ("PEKEKK") (wherein Ar is moiety (i), E and E' are oxygen atoms, G is a direct link, m is 0, w is 1, r is 0, s is 1, and A and B are 1); polyetheretherketoneketone ("PEEKK") (wherein Ar is moiety (iv), E and E' are oxygen atoms, G is a direct link, m is 0, w is 0, and s, r, A and B are 1); polyether-diphenyl-ether-ether-diphenyl-ether-phenyl-ketone-phenyl (wherein Ar is moiety (iv), E and E' are oxygen atoms, m is 1, w is 1, A is 1, B is 1, r and s are 0, and G is a direct link); as well as blends and copolymers thereof.

Another suitable type of high performance thermoplastic polymer that may be employed is a polyetherimide. Generally, polyetherimides are substantially amorphous polymers with a relatively high glass transition temperature, such as about 150° C. or more, in some embodiments from about 180° C. to about 260° C.

Polyetherimides typically have the following general formula:

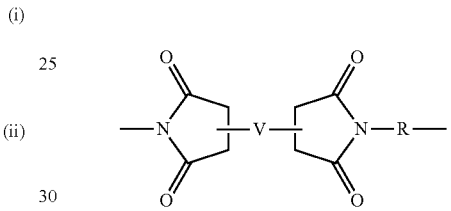

wherein,

V is alkyl, alkenyl, alkynyl, aryl, heteroaryl, cycloalkyl, or heterocyclyl; and R is a substituted or unsubstituted divalent organic radical, such as aryl (e.g., 1,4-phenylene, 1,3-phenylene, etc.) alkenyl, heteroaryl, cycloalkyl, or heterocyclyl, or divalent radicals of the general formula:

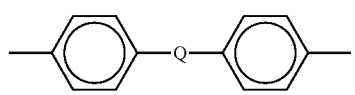

in which Q is a divalent radical, such as —$C_yH_{2y}$—, —CO—, —$SO_2$—, —O—, —S—, etc., and y is an integer of from 1 to 5, and in some embodiments, from 2 to 3.

Polycarbonates encompassed herein include homopolycarbonates, copolycarbonates and copolyestercarbonates and mixtures thereof. In one embodiment, a polycarbonate can have number average molecular weights of about 8,000 to more than 200,000 and an intrinsic viscosity (I.V.) of 0.40 to 1.5 dl/g as measured in methylene chloride at 25° C. The glass transition temperature of polycarbonates can generally range from about 145° C. to about 150° C.

Polycarbonates are a known class of high impact resistant thermoplastic resins characterized by optical clarity and high ductility. Polycarbonates can be defined as polymers containing recurring carbonate groups (—O—CO—O—) in the main chain. Aromatic polycarbonates can be utilized in one embodiment. Suitable aromatic polycarbonates can include polycarbonates made from at least one dihydric phenol and a carbonate precursor, for example by using an interfacial polymerization process.

Suitable dihydric phenols that may be utilized include compounds with one or more aromatic rings containing two hydroxyl groups, each directly attached to a carbon atom of an aromatic ring. Examples of such compounds include 4,4'-dihydroxybiphenyl, 2,2-bis(4-hydroxyphenyl)propane (bisphenol-A), 2,2-bis(4-hydroxy-3-methylphenyl)propane, 2,2-bis-(3-chloro-4-hydroxyphenyl)-propane, 2,2-bis-(3,5-dimethyl-4-hydroxyphenyl)-propane, 2,4-bis-(4-hydroxyphenyl)-2-methylbutane, 2,4-bis-(3,5-dimethyl-4-hydroxyphenyl)-2-methylbutane, 4,4-bis(4-hydroxyphenyl)heptane, bis-(3,5-dimethyl-4-hydroxyphenyl)-methane, 1,1-bis-(4-hydroxyphenyl)-cyclohexane, 1,1-bis-(3,5-dimethyl-4-hydroxyphenyl)-cyclohexane, 2,2-(3,5,3',5'-tetrachloro-4,4'-dihydroxybiphenyl)propane, 2,2-(3,5,3',5'-tetrabromo-4,4'-dihydroxybiphenyl)propane, (3,3'-dichloro-4,4'-dihydroxyphenyl)methane, bis-(3,5-dimethyl-4-hydroxyphenyl)-sulfone, bis-4-hydroxyphenylsulfone, bis-4-hydroxyphenylsulfide.

The carbonate precursor can be a carbonyl halogenide, a halogen formiate or a carbonate ester. Examples of carbonyl halogenides include carbonyl chloride and carbonyl bromide. Examples of suitable halogen formiates are bis-halogen formiates of dihydric phenols like hydrochinon or of glycols like ethylene glycol. Examples of suitable carbonate esters include biphenyl carbonate, di(chlorophenyl)carbonate, di(bromophenyl)carbonate, di(alkylphenyl)carbonate, phenyltolyl carbonate and mixtures thereof. Although other carbonate precursors may be used as well, carbonylhalogenides and especially carbonylchloride, better known as phosgene, are preferred.

A thermoplastic composition can include one or more thermoplastic polymers in conjunction with additives as are generally known in the art including, without limitation, impact modifiers, fillers, antimicrobials, lubricants, pigments or other colorants, antioxidants, stabilizers, surfactants, flow promoters, solid solvents, electrically conductive additives, and other materials added to enhance properties and processability. Such optional materials may be employed in the polymer composition in conventional amounts and according to conventional processing techniques.

In one embodiment, a fibrous filler can be included in the thermoplastic composition. A fibrous filler may include one or more fiber types including, without limitation, polymer fibers, glass fibers, carbon fibers, metal fibers, natural fibers such as jute, bamboo, etc., basalt fibers, and so forth, or a combination of fiber types. For instance, the fibers may be chopped fibers, continuous fibers, or fiber rovings.

Fiber sizes can vary as is known in the art. In one embodiment, the fibers can have an initial length of from about 3 mm to about 5 mm. In another embodiment, for instance when considering a thermoplastic tape or tow, the fibers can be continuous fibers. Fiber diameters can vary depending upon the particular fiber used. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

As used herein, the term "roving" generally refers to a bundle of individual fibers. The fibers contained within the roving can be twisted or can be straight. The number of fibers contained in each roving can be constant or vary from roving to roving. Typically, a roving contains from about 1,000 fibers to about 100,000 individual fibers, and in some embodiments, from about 5,000 to about 50,000 fibers.

As used herein, the term "tow" generally refers to a composite including continuous fibers impregnated in a polymeric composition. For instance, one or more rovings can be embedded in a thermoplastic or a thermoset composition to form a tow.

A melt processing device is generally employed to form a thermoplastic component, e.g., a continuous fiber thermoplastic composite, for combination with a thermoset component. For instance, a single device can be used to form the thermoplastic composition and to embed the continuous fibers within the thermoplastic composition, although this is not a requirement, and a thermoplastic composition can first be formed, for instance in an extrusion device as is generally known. Following initial formation, the thermoplastic composition, for instance in the form of chips or flakes, can be fed to a device that then embeds the continuous fibers within the melted thermoplastic composition. Among other things, the melt processing device facilitates the ability of the thermoplastic composition to be applied to the entire surface of the fibers and/or fiber rovings.

A thermoplastic composition may be further shaped following formation and prior to addition of a binding layer on the thermoplastic component that includes the composition. For instance, a continuous fiber composite extrudate may be consolidated as with rollers to form a composite thermoplastic tape.

Formation of a continuous fiber composite is not limited to a melt extrusion pultrusion method, and a continuous fiber composite can be produced by a number of impregnation methods including, without limitation, emulsion, slurry, fiber commingling, film interleaving, and dry powder techniques. In general, a preferred formation method can depend upon the polymer (e.g., thermoplastic or thermoset) of the composition.

For instance, an emulsion process can be used to form a polymer composite by forming an aqueous emulsion including the polymer composition having a very small particle size and applying the emulsion to the continuous fibers. For example, the thermoplastic composition can be milled and combined with a diluent such as water or a water-methanol mixture. A suitable methanol to water mixing ratio can be from 30/70 to 50/50 by weight. The continuous fibers can then be soaked in the emulsion and squeezed by means of squeeze rollers, etc. to encourage pickup of the polymer composition by the fibers. The composite can then be dried, usually in a hot air drier.

Slurry coating or wet powder processing can be utilized to form a continuous fiber composite. In slurry coating, a powder including the polymer composition can be suspended in a liquid medium, generally water, wherein no solvency exists between the resin and the medium, and the fiber bundles are drawn through the slurry. The slurry particulate matrix may not wet out the fiber, in which case high pressure can be utilized to consolidate the polymer composition and the fibers into a composite.

To achieve intimate mixing in emulsion or slurry coating, the particle size of the slurry or emulsion can generally be smaller than the fiber diameter.

In fiber commingling, the polymer composition is introduced in fibrous form. Specifically, fibers of the polymer composition and the continuous fibers are mingled as dry blends and wetting of the continuous fibers by a process such as melting thermoplastic composition fibers is carried out to consolidate the composite. High pressure can also be used during consolidation of the continuous fiber composite.

Film casting is another method that can be utilized in forming a continuous fiber composite. A film casting method can include first forming a film of the polymer composition. For example, a thermoplastic composition can be melt extruded to form a film. The continuous fibers can then be sandwiched between two films formed of the thermoplastic composition. The multi-layer structure can then be melted and calendared to force the resin into the fibers and form the continuous fiber composite.

Dry powder coating of continuous fibers is a relatively recent method developed in continuous fiber composite technology. This method may be advantageous in certain embodiments as no solvent is required and no high stress is introduced in the process. The ultimate goal for almost all powder coating applications is the ability to deposit a thin, even thickness, high quality coating as efficiently as possible. The polymer composition can be solid at ambient and elevated storage temperatures, and can be capable of melting to form an adequately low viscosity material that can permit flow and to penetrate the fiber tow when heated.

Regardless of the technique employed, when considering a continuous fiber composite, the continuous carbon fibers are oriented in a longitudinal direction of the composite (the machine direction) to enhance tensile strength. Besides fiber orientation, other aspects of the process are also controlled to achieve the desired strength.

A thermoplastic component can be surface modified to include a polymeric binding layer that can be utilized to directly or indirectly bind a surface of a thermoset component in formation of a thermoset/thermoplastic composite. While the polymer(s) used to form the binding layer can comprise multiple different functionalities, the polymer(s) can include a relatively high concentration of epoxy functionality that can be utilized to bind the polymer to the thermoplastic component as well as to crosslink the polymer and bind the polymer to the thermoset component.

Epoxy is highly reactive and can react with any of carboxy, hydroxy, amino, thiol, or anhydride functional groups under a wide variety of conditions. As such, the epoxy-containing polymers can be readily bonded to a surface of the thermoplastic component via functionalities that can already exist on the surface. As such, preprocessing of a thermoplastic component prior to binding of the binding layer will not be required in many embodiments. For example, a thermoplastic polymer and/or additives of the thermoplastic composition can be formed or processed to include reactive functionality for reaction with the binding polymer. For instance, the surface of a thermoplastic component may be oxidized through any suitable oxidation method including, but not limited to, corona discharge, chemical oxidation, flame treatment, plasma treatment, or UV radiation.

The particular bond formed between the thermoplastic component and the epoxy groups of the polymer can depend upon the functionality on the surface and as such, the polymer may be bound via covalent bonds, hydrogen bonds, ionic bonds, etc. Though, in general, stronger covalent bonds can be preferred.

The epoxy-containing polymer deposited on the surface can cross-link following or even during initial deposition. As such, epoxy-containing polymers can form a permanent or quasi-permanent binding layer on the thermoplastic component. Due to the high concentration of epoxy groups available on the binding polymer, a consolidated, cross-linked binding layer that is firmly affixed to a surface of the thermoplastic component can be formed with additional reactive epoxy functionality still remaining in the binding layer following formation. This remaining epoxy functionality can provide a relatively simple route for subsequent direct or indirect binding of the layer to a thermoset component.

In one embodiment, an epoxy-containing binding polymer can be a relatively high molecular weight polymer having a relatively high density of epoxy functionality. For example, an epoxy-containing polymer having a number average molecular weight of about 2,000 or greater may be used to form the binding layer. In one embodiment, a binding polymer can have a number average molecular weight of about 100,000 or greater. In general the binding polymer can include an epoxy functionality density of about 10 or more reactive epoxy groups per polymer prior to binding to the thermoplastic component and crosslinking.

Beneficially, there are a wide variety of epoxy-containing polymers having a relatively high epoxy density that are suitable for use. Optionally, however, a binding polymer may be preprocessed to provide a particular epoxy density and/or other desired characteristics.

Generally, any epoxy-containing homopolymer or copolymer possessing about 10 or more oxyrane rings per polymer can be utilized in forming a thermoplastic/thermoset composite. Exemplary binding polymers can include, for example and without limitation, epoxidized polybutadiene, epoxidized polyisoprenes, and poly(glycidyl methacrylate) (PGMA), and combinations thereof. The binding polymer can be a homopolymer or can be a block, graft, alternating, or random copolymer, in which at least one of the monomer units of the copolymer includes one or more epoxy functionalities.

The binding polymer may be applied to a surface of a thermoplastic component according to any suitable methodology. For example, in one embodiment, a solution may be formed and the thermoplastic component may be sprayed with or immersed in the polymer-containing solution. In one embodiment, a fairly dilute solution of the polymer may be formed. For example, a solution may contain from about 0.02% to about 0.5% of the polymer by weight in an organic solvent (e.g., tetrahydrofuran or a ketone solvent) and the substrate may be dip-coated in the solution. Aqueous or aqueous/alcoholic solutions are not outside the scope of the present invention, though an aqueous-based solution may present certain difficulties due to the tendency of the epoxy groups to hydrolyze in the presence of water. For instance, it may be preferable to utilize an aqueous polymer solution fairly soon after formation.

Upon application of the binding polymer to the thermoplastic component (optionally in conjunction with energy addition), a portion of the epoxy groups of the polymer can react with functional groups on the surface. The attachment may involve chemisorption or physisorption of the polymer on the surface, depending upon the materials involved.

FIG. 1 illustrates one embodiment of a binding layer 30 bonded to a surface 14 of a thermoplastic component 12. As shown, a single epoxy-containing polymer can be grafted to the surface 14 of the substrate 12 at multiple points 10 along the length of the polymer according to a reaction between the epoxy functionality and reactive functionality on the surface 14 of the substrate 12. In this manner, a secure attachment can be formed between the binding polymer and the surface 14. The binding polymer attached to the surface 14 at multiple random points 10 along the length of the polymer can exhibit trains 20 (polymer length between bonds), tails 22 (non-bonded polymer ends), and loops 24 (polymer sections looped above the surface 14) that can extend the height of the polymer above the substrate surface providing a depth to the binding layer 30.

The binding polymer includes epoxy functionality in addition to that used for attachment of the polymer to the surface. As such, in addition to a portion of the epoxy being utilized for binding the polymer to the surface, a second portion of the epoxy functionality of the polymer can cross-link the polymer. With reference to FIG. 1, the polymer can form cross-links 32 to self-cross-link a single polymer as well as to cross-link adjacent polymers to each other.

Binding polymers can spontaneously crosslink simultaneous with the attachment reactions as the polymers are bound to the surface or alternatively the binding polymers may be encouraged to crosslink through addition of energy, such as thermal or radiant energy. Combinations of crosslinking protocols may also take place.

According to one exemplary self-crosslinking protocol, attachment of the binding polymer to the surface through epoxy ring opening can generate hydroxyl groups in the glycidyl fragment. In addition, minor occurrence of opened epoxy rings can be present on the polymer due to traces of water in the environment. At some point, such as during energy addition for example, these hydroxyl groups can react with another epoxy ring of the layer yielding a crosslink having an ether linkage. This can also generate a new hydroxyl group in the polymer that is able to initiate further crosslinking.

A binding layer (e.g., a polymer solution used to form a binding layer) can optionally be crosslinked by use of a crosslink agent to further encourage crosslinking. In general, a crosslinking agent can be any compound bearing two or more moieties, at least one of which being able to react with epoxy ring. For example, ethylene diamine, hydrazine, dicarboxylic acids and the like can be utilized.

Energy may be added to encourage reactions on the surface. For example, the rates of both the crosslinking reactions and the surface attachment reactions can be increased by heating the surface before, during, and/or after contact with the binding polymer to a temperature of between about 40° C. and about 150° C. For instance, following application of a solution containing the binding polymer to a surface, the surface can then be heated and held for about 5 minutes at a temperature of about 100° C. to promote both the attachment and crosslinking reactions that can form the binding layer on the substrate surface.

Following attachment and crosslinking of the binding polymer on a surface, the binding layer can still include an amount of reactive epoxy, at least a portion of which that be utilized for directly or indirectly binding a thermoset component to the thermoplastic component. For example, from about 10% to about 30% of the epoxy groups on the binding polymer can react with surface functionalities and form attachment points between the polymer and the surface. Generally, from about 10% to about 40% of the epoxy groups on the polymer can be utilized in crosslinking the layer. A third portion of the epoxy groups of the binding polymer, for instance from about 20% to about 50% in some embodiments, can remain unreacted within the binding layer following formation of the crosslinked binding layer on the surface and can be available for subsequent attachment of the surface to a thermoset component.

Figure 2:
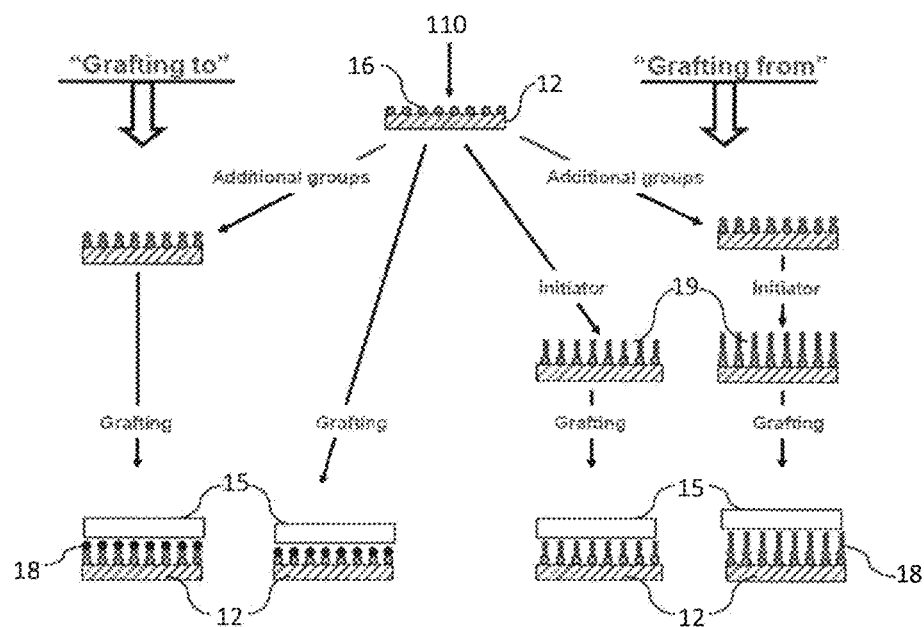
FIG. 2 illustrates methods for 'grafting to' and 'grafting from' a binding layer of a thermoplastic component.

This third portion of the epoxy groups of the binding layer can be utilized to bond a thermoset component to the thermoplastic component according to either a 'grafting to' process or a 'grafting from' process. FIG. 2 schematically illustrates examples of 'grafting to' and 'grafting from' processes.

As shown in the left side of FIG. 2, in a 'grafting to' process, the composite 110 including reactive epoxy groups 16 on the thermoplastic component 12 can be further treated to include additional reactive groups (e.g., a different type of reactive group, e.g., aldehyde, carboxyl, etc.) that can then be utilized to directly bond with a thermoset component 15 and form a thermoplastic/thermoset component with the bonding layer 18 between the two. In a second embodiment of a 'grafting to' process the epoxy groups 16 of the pretreated thermoplastic component 110 can be utilized to directly bond with reactive functionality of the thermoset component 15 and form the thermoset/thermoplastic composite.

Figure 3:
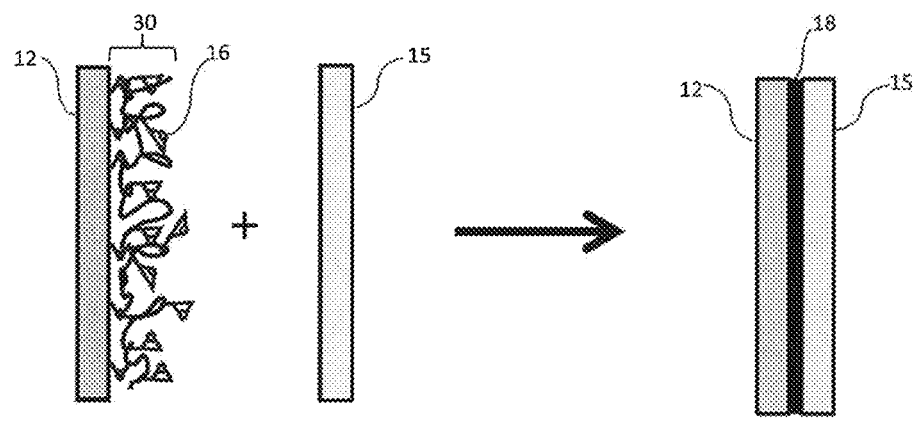
FIG. 3 illustrates a method for directly grafting a thermoset component to a thermoplastic component via a binding layer via a 'grafting to' process.

FIG. 3 illustrates one embodiment of the present invention in which a thermoset component 15 possessing any of several different possible functional groups, e.g., carboxy, anhydride, amino and/or hydroxy groups, on a surface may be directly grafted to a thermoplastic component 12 via the epoxy groups 16 of a binding layer 30 on a surface of the thermoplastic component 12. The formed thermoset/thermoplastic composite can then include the thermoplastic component 12 tightly bonded to the thermoset component 15 via the binding layer 18 within which most or all of the epoxy functionalization has been reacted.

Referring again to FIG. 2, in a 'grafting from' attachment mechanism, a secondary polymer 19 can be bonded to the thermoplastic component 12 via the epoxy groups 16 of the thermoplastic composite 110, and this secondary polymer 19 can include the reactive functionality that directly bonds to a surface reactive functionality of the thermoset component 15. The formed thermoset/thermoplastic composite includes the thermoplastic component 12, the thermoset component 15 and the binding layer 18 that, in this 'grafting from' embodiment, includes both the original polymer that provided the reactive epoxy and the secondary polymer 19. As shown, the secondary polymer can be formed on the surface of the composite 110 either by polymerization of a monomer, in which the monomer and initiator can be provided in a combined solution, or alternatively in a two-step process in which a polymerization initiator is first grafted to the epoxy groups and the secondary polymer 19 is then grafted to the surface via the polymerization initiator.

Figure 4:
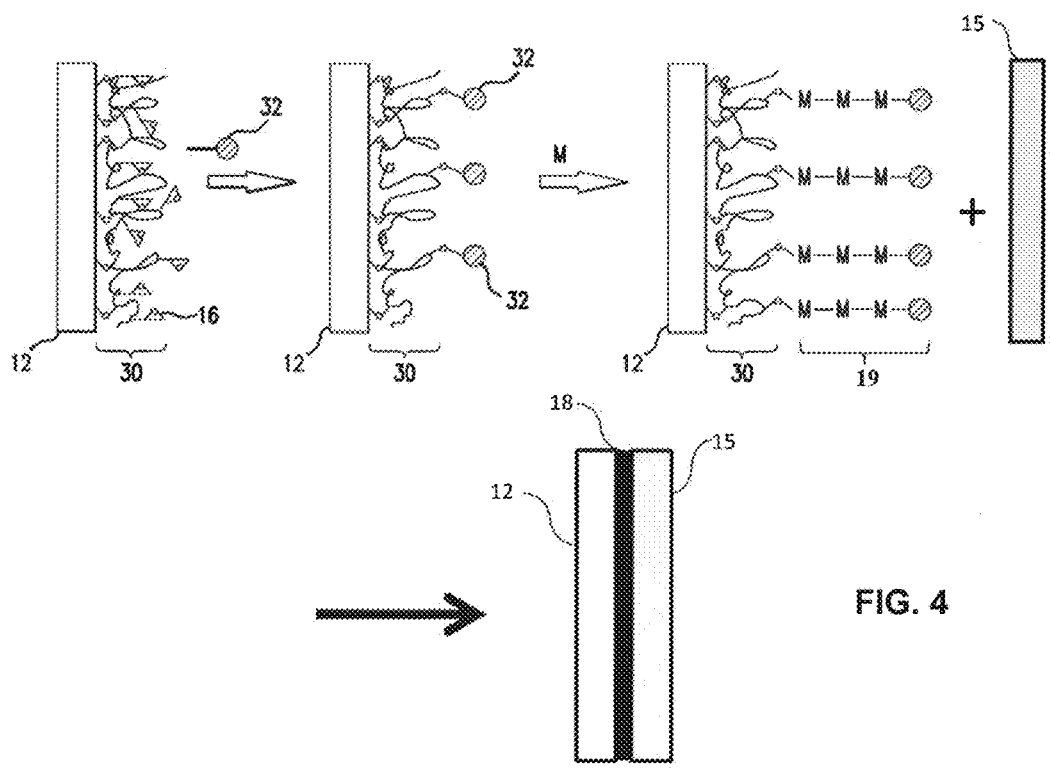
FIG. 4 illustrates a method for indirectly grafting a thermoset component to a thermoplastic component via a binding layer via a 'grafting from' process.

For example, as illustrated in FIG. 4, a polymerization initiator 32 can be grafted to the binding layer 30 on a surface of a thermoplastic component 12. Following, a monomer M may then be polymerized on the binding layer 30. For example, vinyl aromatic monomers, acrylate monomers or methacrylate monomers can be polymerized on the surface of the thermoplastic component via epoxy functionality 16 of the binding layer 30. In this embodiment, the secondary polymer 19 may be 'grown' on the binding layer 30 such as through a graft polymerization process. For instance, a graft polymerization initiator 32 can be grafted to the binding layer 30 at epoxy groups 16 as shown. Subsequent contact between the thermoplastic component 12 carrying the polymerization initiator 32 and monomer M at reaction conditions can lead to the polymerization of the monomer M on the substrate surface via the binding layer 30. In general, the polymerization initiator 32 can be grafted to the binding layer 30 via covalent bond-forming reactions with the epoxy groups 16, though this is not a requirement of the present invention.

Following grafting of the secondary polymer 19 to the binding layer 30, a thermoset component 15 can then be bonded to the thermoplastic component 12 via reaction between reactive functionality of the secondary polymer 19 and reactive functionality at a surface of the thermoset component 15, thus forming a thermoset/thermoplastic composite that includes a thermoplastic component 12, a thermoset component 15, and a crosslinked binding layer 18 adhered to both components.

According to one embodiment, a 'grafting from' process can be carried out via Atom Transfer Radical Polymerization (ATRP). According to this embodiment, following or concurrent with attachment of an initiator to a binding layer, the thermoplastic component can be contacted with the monomer, and polymerization can be initiated from the surface via the binding layer. Thus, a secondary polymeric layer possessing high grafting density, for example about 2 chains/nm$^2$ or higher, may be synthesized on the surface via the reactive binding layer.

Various polymerization initiators may be utilized in a graft polymerization process. In one embodiment, an acid may be used such as, for example, bromoacetic acid, which can be grafted to the free epoxy groups of the binding layer at the carboxylic functionality. Other polymerization initiators may be alternatively utilized, however. For instance, any polymerization initiator displaying carboxy, anhydride, amino, or hydroxy functionality that may graft to the epoxy-containing binding layer may be utilized. Monomers that may be polymerized on the surface of the substrate from the polymerization initiator are generally well known in the art and include, for example, vinyl aromatic compounds including, for example, styrene and 2-vinylpyridine, acrylates, or methacrylates can be polymerized. In general, any vinyl monomer that may polymerize by radical polymerization employing the initiator according to any known polymerization process as is generally known in the art may be utilized.

The thermoset component can include a thermoset composition that includes one or more thermoset polymers in addition to any additives as are generally known in the art. For example the thermoset composition can include a matrix resin selected from one or more of an epoxide, a polyimide, a bis-maleimide, a polyphenol, a polyester, etc., or combinations thereof that, when fully cured, forms a crosslinked thermoset matrix.

An epoxy as may be utilized as the matrix resin in a thermoset composition may suitably comprise epoxy compounds having more than one epoxide group per molecule available for reaction. Such epoxy prepolymers include, but are not limited to, polyfunctional ethers of polyvalent phenols, for example pyrocatechol; resorcinol; hydroquinone; 4,4'-dihydroxydiphenyl methane; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulphone; or tris-(4-hydroxyphenyl) methane; polyglycidyl ethers of the chlorination and bromination products of the above-mentioned diphenols; polyglycidyl ethers of novolacs (i.e., reaction products of monohydric or polyhydric phenols with aldehydes, formaldehyde in particular, in the presence of acid catalysts); polyglycidyl ethers of diphenols obtained by esterifying 2 moles of the sodium salt of an aromatic hydroxycarboxylic acid with 1 mol of a dihalogenoalkane or dihalogen dialkyl ether; and polyglycidyl ethers of polyphenols obtained by condensing phenols and long-chain halogen paraffins containing at least 2 halogen atoms.

Other suitable thermoset materials include polyepoxy compounds based on aromatic amines and epichlorohydrin, for example N,N'-diglycidylaniline; N,N'-dimethyl-N,N'-diglycidyl-4,4'-diaminodiphenyl methane; N-diglycidyl-4-aminophenyl glycidyl ether; N,N,N,N'-tetraglycidyl-4,4'-diaminodiphenyl methane; and N,N,N',N'-tetraglycidyl-1,3-propylene bis-4-aminobenzoate.

Glycidyl esters and/or epoxycyclohexyl esters or aromatic, aliphatic and cycloaliphatic polycarboxylic acids, for example phthalic acid diglycidyl ester and adipic ester diglycidyl and glycidyl esters of reaction products of 1 mol of an aromatic or cycloaliphatic dicarboxylic acid anhydride and ½ mol of a diol or 1/n mol of a polyol with n hydroxyl groups, or hexahydrophthalic acid diglycidyl esters, optionally substituted by methyl groups, are also suitable.

Glycidyl ethers of polyhydric alcohols, for example of 1,4-butanediol; 1,4-butenediol; glycerol; 1,1,1-trimethylol propane; pentaerythritol and polyethylene glycols may also be used. Triglycidyl isocyanurate; and polyglycidyl thioethers of polyvalent thiols, for example of bis mercaptomethylbenzene; and diglycidyltrimethylene sulphone, are also suitable.

An epoxy resin composition can also include a curing agent for the epoxy resin. Such curing agents are well known to those skilled in the art, and include, without limitation diamines, including, but not limited to, diaminodiphenyl sulphone, diaminodiphenyl methane, phenylenediamine, etc.

Thermoset polyimides can include those prepared according to the practice in which intermediate polyamide acids are first synthesized. Generally these polyamide acids are of two types, high molecular weight and end-capped low molecular weight.

Condensation type aryl polyimides are also encompassed herein. Such polyimides can, in one embodiment, be produced by reacting an aryl dianhydride and an aryl diamine in an aprotic solvent. Initial reaction produces a polyamide acid through chain extension.

Methods for producing high molecular weight polyimides without the necessity of forming polyamide acids are also known. For example, U.S. Pat. No. 3,528,950 (incorporated herein by reference) describes a method in which a low molecular weight prepolymer is prepared by reacting a poly-functional amine, a poly-functional anhydride, and an end-capping mono-anhydride of the formula:

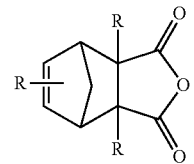

where R represents hydrogen or a lower alkyl, by refluxing for a period of 18 hours.

Such treatment yields two polyimide prepolymers, one of a higher molecular weight and a second of a lower molecular weight, which are subsequently blended in dry-powder form. The blend of prepolymer can then be heated to a temperature of 200° C. to 350° C. to form polyimide macro-molecules.

In yet another embodiment, macromolecular aryl polyimides can be synthesized from a mixture including at least one ester of tetracarboxylic acids, one or more diamines that include a divalent aryl radical, and one or more mono- or dialkyl esters of dicarboxylic acids.

The esters of the tetracarboxylic acid may be readily prepared according to the known methods from the corresponding dianhydrides. Representative of the many dianhydrides which may be employed include pyromellitic dianhydride, 3,3', 4,4'-benzophenone tetracarboxylic dianhydride, 2,3,6,7-naphthalene tetracarboxylic dianhydride, 1,2,5,6-naphthalene tetracarboxylic dianhydride, 2,2', 3,3'-diphenyl tetracarboxylic dianhydride, bis (3,4-dicarboxphenyl) sulfone dianhydride, 1,4,5,8-naphthalene tetracarboxylic dianhydride.

Representative diamines include benzidine, 4,4'-methylenedianiline, 4,4'-diaminodiphenyl sulfone, m-phenylenediamine, p-phenylenediamine.

The mono- or dialkyl esters of the dicarboxylic acid may be prepared readily from the corresponding anhydride. Representative of anhydrides include maleic anhydride, citraconic anhydride, 5-norbornene-2,3-dicarboxylic anhydride, methyl-5-norbornene-2,3-dicarboxylic anhydride.

An organic solvent can employed to dissolve the esters and diamine. The solvent is one of which does not react with the amines or esters during the processing conditions. Representative examples of suitable solvents are N,N-dimethylformamide, N,N-dimethylacetamide, dimethyl sulfoxide, N-methylpyrrolidone, aliphatic alcohols, aliphatic alcoholethers, and alkylbenzenes such as xylene. Mixtures of two or more of such solvents may be employed.

Bis maleimide resins as are known in the art can be employed as the thermoset matrix resin. For instance, suitable bis maleimide resins can include those based on the following monomers:

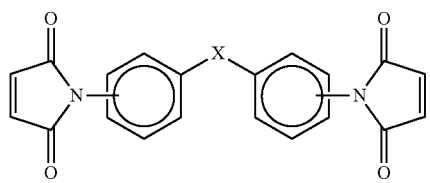

wherein the isomeric species are meta, meta; meta, para or para, para; and

X=—CH$_2$—, —O—, —S—, or

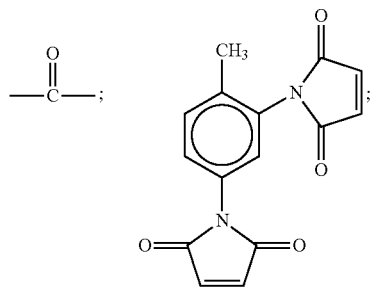

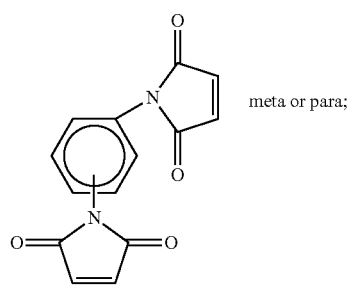

meta or para;

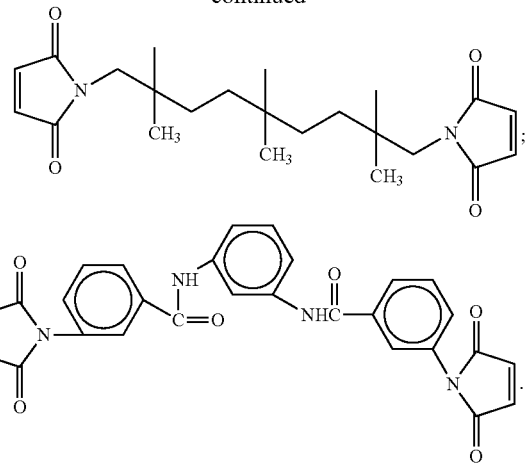

A thermoset composition can include additives as are generally known in the art. For instance, curing agents, impact modifiers, fillers, dyes, pigments, plasticizers, curing catalysts and other such conventional additives and processing aids may be added to the thermosetting resin compositions described herein before curing to influence the properties of the final resin composite. Additives in a thermoset composition can include thermoplastic materials such as found in toughened epoxies that can incorporated thermoplastic impact modifiers incorporated in the thermoset matrix as well as other additives as are generally known in the art.

In one particular embodiment, the thermoset composition can include a fibrous additive, and in particular a continuous fiber additive in the form of rovings such as discussed previously impregnated in the thermoset composition. The thermoset tow thus formed can be combined with the surface modified thermoset component and, upon final cure of the thermoset resin, can be strongly adhered to the thermoset component to form the thermoset/thermoplastic composite. By way of example, an uncured or partially cured thermoset composition can be formed by impregnating continuous fibers in the form of fiber rovings in the thermoset composition to form thermoset composite tapes according to fiber placement and fiber steering methods as are known in the art. In one embodiment, a fiber placement and fiber steering method can be utilized to form the thermoset component simultaneously with combining the thermoset component with the surface modified thermoplastic component.

Briefly, in a fiber placement process, narrow (e.g., about 0.125 in.) tows of resin impregnated fiber can be drawn under tension across a tool of the geometry by a computer controlled head. This head can be capable of delivering up to approximately thirty adjacent tows simultaneously, allowing for high production rates. The narrow tows provide precise control over fiber orientation and, since each tow can be controlled independently, thickness tapers on complex geometry can be readily produced.

A system can provide for adds and cuts (i.e., the start and stop of individual tows) to be controlled by a computer via a CAD interface. For instance, a plurality of feed paths can be employed in a single layer of a composite structure to form a predetermined curve of a final product. In forming a complex shape, the feed rate of each tow can be individually controlled, allowing the longer path of certain tows of a steered radius to feed faster than the shorter path tows.

The ability to support differential tow feed rates combined with the ability to add and drop individual tows provides the opportunity to place fibers along a relatively tight radius with no degradation in component quality. In addition, the capability allows for the interleaving of tows of different polymeric compositions. In particular, a method can be utilized to combine tows of a partially or uncured thermoset composition with surface modified tows of a thermoplastic composition in forming a composite as described herein. Tows of different compositions can be combined within an individual layer, as alternating individual layers, in a pattern of layer compositions (e.g., one or more thermoplastic layers between each thermoset layer), or any combination thereof.

Fiber steering is generally carried out by local compaction during placement of the fibers, with each of the impregnated tows having enough tack to overcome any sliding forces. Fiber steering offers potential weight savings by overcoming the restriction of discrete linear fiber orientations commonly associated with traditional composites while the fiber placement process allows tailoring of the composite structure within a ply level by placing composite tows along curvilinear paths. The combined capabilities provide for optimized structural configurations by tailoring fiber paths within a ply to load paths of the component as well as for combining thermoset compositions with the surface modified thermoplastic components.

Of course, fiber placement and fiber steering technologies are not required in formation of a thermoset/thermoplastic composite, and other known methodologies can be utilized. By way of example, a thermoset component can be formed and/or combined with a surface modified thermoplastic component according to a hand layup process, an open molding process, a resin infusion process, resin transfer molding (e.g., vacuum-assisted resin transfer molding), reaction injection molding, resin film infusion, compression molding, centrifugal casting, and so forth.

Following formation of the thermoset component and combination of the partially or uncured thermoset component with the thermoplastic component, final cure of the thermoset component can be carried out, which can complete formation of the thermoset structure and bind the thermoset composition to the thermoplastic component via reaction between reactive functionality of a component of the thermoset composition (generally though not limited to reactive functionality of the thermoset polymer itself) and reactive functionality of the binding layer.

Figure 5:
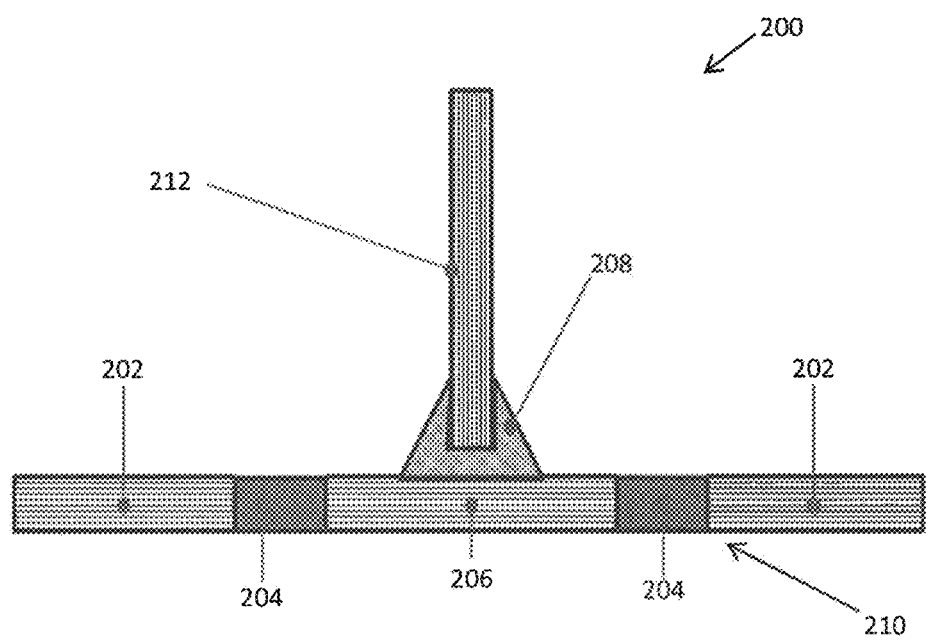
FIG. 5 illustrates one embodiment of a composite structure that includes a thermoset section, a hybrid thermoset/thermoplastic section, and a thermoplastic section at a joint at which the composite structure is fusion bonded to another thermoplastic component.

FIG. 5 illustrates one embodiment of a structure 200 that includes a laminate thermoset/thermoplastic composite 210 welded to a thermoplastic component 212. The thermoset/thermoplastic composite 210 includes sections 202 of a laminate comprising multiple individual layers, each of which can include a thermoset composition. Thus, these portions of the composite can be referred to as thermoset sections of a structure.

The composite 210 also includes a hybrid sections 204 that include the thermoset layers (e.g., tapes) combined with the surface modified thermoplastic layers. A hybrid section 204 can be formed, for example, as described above according to fiber placement and fiber steering methods in which thermoplastic tows can be added and thermoset tows can be cut within and among layers and multiple layers can be combined to form the hybrid laminate sections 204. As the thermoset tows are cut at an end of a hybrid section 204, a thermoplastic section 206 can remain that forms a thermoplastic implant within the thermoset sheet or tape.

The thermoplastic implant can be utilized in one embodiment as a joint location. For instance, the thermoplastic section 206 can be joined with another thermoplastic component 212 at a welded joint 208.

A thermoset/thermoplastic composite can include materials in addition to a thermoplastic component and thermoset component, as desired. For instance, a composite can include metal inserts, a honeycomb core, a foam core, an outer coating, etc.

The thermoset/thermoplastic composites can be used in one embodiment in transportation applications. For example, the ability to provide a thermoset structure with a thermoset implant useful for joining to a second component can be of great benefit is aerospace and aeronautic application. For instance, a thermoset/thermoplastic composite can be utilized in forming a stiffened skin panel that can be directly welded to thermoplastic stiffeners via the thermoplastic implant according to automated stiffened shell production and assembly techniques for highly loaded fiber-reinforced, thin walled structures useful in transportation applications, among others.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a composite comprising:
   grafting a binding polymer to a first surface of a thermoplastic component, the thermoplastic component comprising a thermoplastic composition at the first surface, the binding polymer including a plurality of epoxy groups, the grafting including reaction of a first portion of the plurality of epoxy groups with a reactive functionality at the first surface of the thermoplastic component;
   crosslinking the binding polymer via reaction of a second portion of the plurality of epoxy groups to form a crosslinked binding layer; and
   directly or indirectly binding a second surface of a thermoset component to the crosslinked binding layer, the thermoset component comprising a thermoset composition at the second surface, the second surface being directly or indirectly bonded to the crosslinked binding layer via reaction of a third portion of the plurality of epoxy groups.

2. The method of claim 1, wherein the thermoplastic composition comprises a high performance thermoplastic polymer.

3. The method of claim 2, wherein the high performance thermoplastic polymer comprises a polyarylene sulfide, a polyaryletherketone, a polyetherimide, a polycarbonate, a polyimide, or a combination thereof.

4. The method of claim 1, the method further comprising forming the thermoplastic component.

5. The method of claim 1, wherein the thermoplastic component is a continuous fiber tape or tow.

6. The method of claim 1, further comprising surface treating the thermoplastic component at the first surface prior to grafting the binding polymer to the first surface.

7. The method of claim 1, the binding polymer having a number average molecular weight of about 2,000 or greater.

8. The method of claim 1, the binding polymer including an epoxy density of about 10 or more epoxy groups per binding polymer.

9. The method of claim 1, wherein the binding polymer comprises an epoxidized polybutadiene, an epoxidized polyisoprene, poly(glycidyl methacrylate) or a combination thereof.

10. The method of claim 1, wherein the crosslinking occurs spontaneously in conjunction with reaction of the first portion of the plurality of epoxy groups.

11. The method of claim 1, the crosslinking comprising addition of energy to the binding polymer.

12. The method of claim 1, wherein the second surface is indirectly bonded to the crosslinked binding layer, the method further comprising reacting the third portion of the plurality of epoxy groups with one or more additional reactive groups.

13. The method of claim 12, wherein the additional reactive groups are components of a secondary polymer grafted to the binding layer.

14. The method of claim 1, wherein the thermoset composition comprises an uncured or partially cured epoxy, a polyimide, a bis-maleimide, a polyphenol, a polyester, or a combination thereof.

15. The method of claim 1, wherein the thermoset component is a continuous fiber tape or a tow.

16. The method of claim 1, further comprising locating the thermoset component adjacent to the crosslinked binding layer according to a fiber placement and/or fiber steering process.

17. The method of claim 1, further comprising fusion welding a second thermoplastic component to the composite.

18. The method of claim 1, further comprising locating a thermoplastic implant adjacent to the composite.

19. The method of claim 18, further comprising locating the composite between the thermoplastic implant and a thermoset section.

20. The method of claim 19, further comprising fusion welding a second thermoplastic component to the thermoplastic implant.

* * * * *